A. T. BENNET & W. O. ANDERSON.
MACHINE FOR CUTTING RAGS.

No. 80,531. Patented Aug. 4, 1868.

Witnesses:
Chas Bauer
J. E. M. Bowen

Inventor:
A. T. Bennett
W. O. Anderson
By Knight Bro's Att'y

United States Patent Office.

ALLAN T. BENNETT AND WILLIAM O. ANDERSON, OF CINCINNATI, OHIO.

Letters Patent No. 80,531, dated August 4, 1868.

IMPROVEMENT IN MACHINE FOR CUTTING RAGS.

The Schedule referred to in these Letters Patent and making part of the same.

TO ALL WHOM IT MAY CONCERN:

Be it known that we, ALLAN T. BENNETT and WILLIAM O. ANDERSON, both of Cincinnati, Hamilton county, Ohio, have invented a new and useful Carpet-Rag Cutter; and we hereby declare the following to be a full, clear, and exact description thereof, reference being had to the accompanying drawings, making part of this specification.

Our invention relates to a machine for cutting rags into narrow strips of uniform width, for working into what are called rag carpets; and consists essentially of a gang of hook-formed knives, which project spirally from a shaft, and are caused to rotate at a high velocity through corresponding notches in a bench, upon and along which the rags are drawn slowly forward by a series of feed-wheels. The said knives act shearwise with knives or plates D' on the notched bench.

The frame A affords journal-bearing to a horizontal shaft, B, armed with a gang of hook-formed knives, $C\ C^1\ C^2\ C^3$, arranged spirally along the shaft, so as to reach the stuff in rapid and regular succession, and thereby cause an equal resistance during the entire rotation of the shaft.

The frame also supports, about on a level with the shaft B, a bench, D, having in its edge nearest to the shaft a series of notches, $d\ d^1\ d^2\ d^3$, for the passage of the knives.

$E\ E^1\ E^2\ E^3$ are a series of feed-wheels, arranged intermediately between the knives, and journalled in boxes F F', on the extremities of spring-bearings G G', made fast to the frame, and regulated as to tension by means of set-screws H H', or otherwise. The spring-bearings, thus secured and adjusted, cause the feed-wheels to press upon the bench with sufficient force to advance the work, while their yielding character enables them to act with equal efficiency upon rags of unequal thickness without suspending the action of or clogging the machine.

Figure 1:
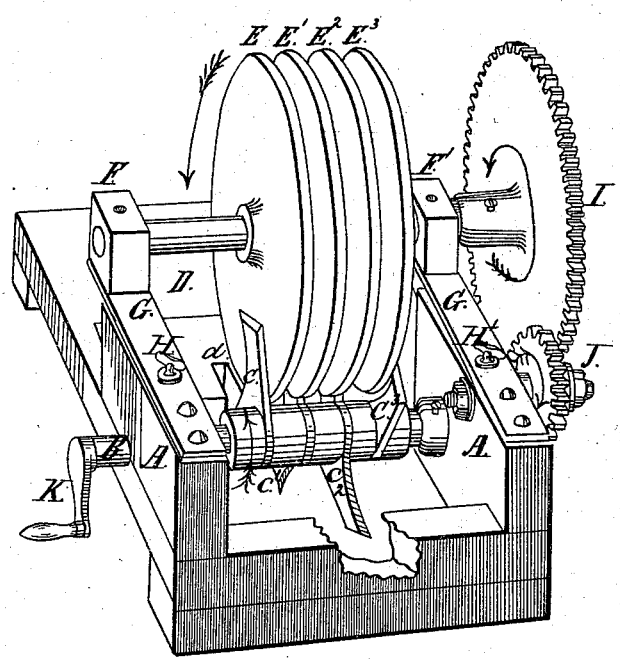
Figure 1 is a perspective view of our machine, viewed from the rear.
Figure 2:
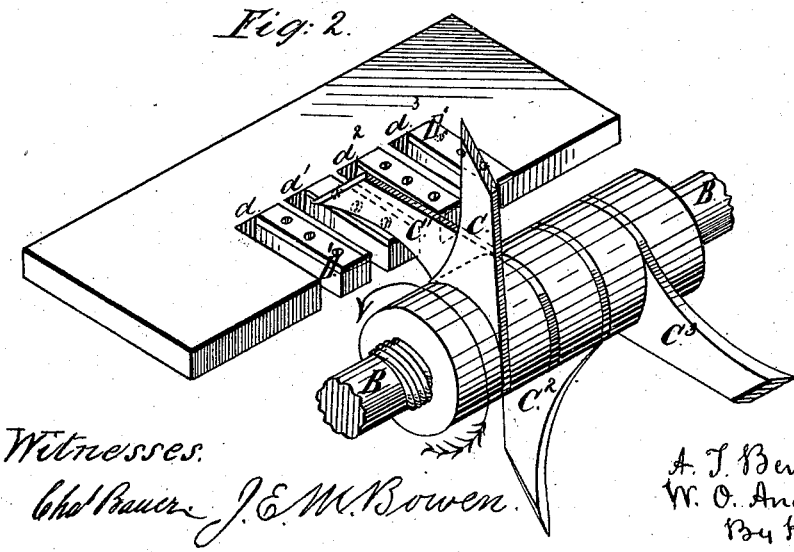
Figure 2 shows the bench and the gang of cutters on a larger scale.

The knives and the feed-wheels aforesaid are driven respectively at a high and low speed by means of suitable intermediate gearing, partially visible at I and J, fig. 1.

The machine may be operated either by a crank, K, or by power.

For the purpose of increasing their traction upon the rags, the peripheries of the feed-wheels may be roughened in the manner shown.

The operation is as follows: The machine being set in operation, rags are pushed along the table D until caught by the feed-wheels, when they are dragged forward by the latter, and cut into shreds by the knives.

If preferred, the notched portion of the bench may be made wholly of steel or of case-hardened or chilled iron.

We claim herein as new, and of our invention—

The combination of the gang of hooked knives $C\ C^1\ C^2\ C^3$, arranged spirally along the shaft, so as to reach the material to be acted upon in rapid and regular succession, the notched bench D, and yielding feed-wheels $E\ E^1\ E^2\ E^3$, all constructed as described, the knives working intermediately between the feed-wheels and projections of bench D, for the purpose set forth.

In testimony of which invention, we hereunto set our hands.

ALLAN T. BENNETT,
WILLIAM O. ANDERSON.

Witnesses:
GEO. H. KNIGHT,
JAMES H. LAYMAN.